(12) United States Patent
Shestak et al.

(10) Patent No.: US 8,605,329 B2
(45) Date of Patent: Dec. 10, 2013

(54) CMYK COLOR CONVERSION USING ITERATIVE COORDINATE REVISION

(75) Inventors: Vladimir V. Shestak, Boulder, CO (US); Hong Li, Superior, CO (US); Larry M. Ernst, Longmont, CO (US); Yue Qiao, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 262 days.

(21) Appl. No.: 13/036,221

(22) Filed: Feb. 28, 2011

(65) Prior Publication Data

US 2012/0218569 A1   Aug. 30, 2012

(51) Int. Cl.
*G06K 1/00* (2006.01)
*G06F 15/00* (2006.01)
*G03F 3/08* (2006.01)

(52) U.S. Cl.
USPC .......................................... 358/1.9; 358/529

(58) Field of Classification Search
None
See application file for complete search history.

(56) References Cited

U.S. PATENT DOCUMENTS

| 6,778,300 | B1 | 8/2004 | Kohler |
| 7,046,393 | B2 | 5/2006 | Zeng |
| 2005/0249408 | A1* | 11/2005 | Haikin ........................... 382/167 |
| 2006/0158669 | A1 | 7/2006 | Haikin et al. |

* cited by examiner

*Primary Examiner* — Marivelisse Santiago Cordero
*Assistant Examiner* — Moustapha Diaby
(74) *Attorney, Agent, or Firm* — Duft, Bornsen & Fettig

(57) ABSTRACT

Systems and methods for color conversion from one CMYK color space to another CMYK color space. The system receives a color defined by a first coordinate in the first CMYK color space. The system converts the color to a second coordinate for the second CMYK color space, and determines a location in a perceptual color space for each of the first coordinate and the second coordinate. The system further identifies a distance between the locations in the perceptual color space, and reduces the distance in the perceptual color space between the two locations by iteratively revising the second coordinate in the second CMYK color space while holding the black level of the second coordinate constant.

20 Claims, 6 Drawing Sheets

CMYK COLOR CONVERSION USING ITERATIVE COORDINATE REVISION

RELATED APPLICATIONS

This application is related to U.S. patent application Ser. No. 12/616,927, filed Nov. 12, 2009, entitled "OUTPUTTING GRAY VALUES IN COLOR-MANAGED CMYK COLOR CONVERSIONS BASED ON INPUT GRAY COLOR VALUES" which is hereby incorporated by reference.

FIELD OF THE INVENTION

The invention relates to the field of color management, and in particular, to CMYK to CMYK color conversion of image data in a manner that preserves the black levels of the image data upon color conversion.

BACKGROUND

In color management, a device may convert colors of input image data to a color space of an output device. For example, a printer may have a CMYK color space that is used to represent the image data using various levels of Cyan (C), Magenta (M), Yellow (Y), and Key black (K). Before the image data is printed, the input image data is converted to the gamut of the CMYK printer. However, precise representation of the image data is generally not possible as information may be lost or misrepresented when the color is converted from its original color space to the new color space of the printer. Other presentation systems that may perform color conversion include monitors, printers, cameras, and scanners.

In certain instances, color conversion is performed between like color spaces, such as CMYK to CMYK. Such a color conversion may appear to be trivial. However, the process generally requires conversion from an input CMYK color space to a perceptual color space (e.g., a "Lab" color space) and then to the output CMYK color space. A Lab color space is visualized as a three dimensional color space having a dimension for Lightness (L), and having color opponent dimensions (a) and (b), where every color that humans can see is uniquely located. Lab color spaces are perceptual color spaces that have been designed to be substantially perceptually uniform. In perceptually uniform color spaces, the Euclidean distance in the space corresponds to the perceptual distance between colors perceived by the human eye. For example, the human visual system (HVS) is sensitive to color changes in neutral color areas, and relatively insensitive to color changes in highly saturated color areas. Thus, in a Lab color space (unlike CMYK color spaces), the Euclidean distance between saturated colors is often smaller than the Euclidean distance between neutral colors.

A color conversion model can be generated to convert CMYK color values to Lab color values, and vice versa. Generally, the relationship between a CMYK color space and a Lab color space (e.g., the CIE 1976 (L*, a*, b*) color space) is nonlinear due to the interactions of cyan, magenta, yellow, and black planes as they are converted into the three dimensions of Lab space. Because color conversion is processing-intensive, pre-computed color profiles that describe the characteristics of color spaces are often used to convert color image data from device-independent color spaces (e.g., CIEL*a*b*) to device-dependent color spaces (e.g., a CMYK color space) and vice versa. These color profiles may comprise lookup tables (LUTs) used to quickly convert color data from one color space to another.

When converting from a first CMYK color space to a second CMYK color space via a device-independent color space, the black level (also known as the Gray Component Replacement (GCR) level) of image data is generally not preserved. This is because the GCR value in the source CMYK color space, represented by a K value, is separated into the color components of the Lab space, and then these color components are integrated into a new output K value for the new color space. This is unfortunate because the black levels for an image often comprise the most important information in an image, and users typically find changes in black levels undesirable. For example, an image to be converted may include black text. It is not desirable to alter the black levels of this text in the image because this affects the readability of the text. Thus, it is desirable to preserve the source GCR of color data in an output CMYK color space.

As currently practiced, K values may be preserved in situations when the remaining C, M, and Y color components in CMYK space are zero. Color conversion systems often refrain from preserving black levels when K values are accompanied by C, M, and Y values. This is because forcing the K value to remain the same while converting C, M, and Y colors with standard color management techniques results in an undesirable perceptual color difference between the original CMYK color and the converted CMYK color. Thus, preserving the source GCR for image data generally results in a loss of color accuracy. Therefore, there is a need to preserve black levels during a CMYK to CMYK color conversion while minimizing the perceptual distance between source colors and converted colors.

SUMMARY

Embodiments described herein preserve the GCR of a color as it is converted from a first coordinate in a first CMYK color space to a second coordinate in a second CMYK color space by holding the black level constant during the color conversion process. These embodiments iteratively revise the location of the second coordinate so as to reduce the perceptual color distance between the first coordinate and the second coordinate. In this manner, conversion values can be generated for lookup tables that preserve source GCR. At the same time, these lookup tables reduce the loss of color accuracy that occurs when source GCR is preserved.

One embodiment is a system that comprises an interface and a color management unit. The interface receives a color defined by a first coordinate in a first Cyan, Magenta, Yellow, and Key black (CMYK) color space. The color management unit converts the color to a second coordinate for a second CMYK color space, and determines a location in a perceptual color space for each of the first coordinate and the second coordinate. The color management unit further identifies a distance between the locations in the perceptual color space, and reduces the distance in the perceptual color space between the two locations by iteratively revising the second coordinate in the second CMYK color space while holding the black level of the second coordinate constant.

In another embodiment, the color management unit iteratively revises the second coordinate by generating a matrix of partial derivatives along the dimensions for cyan, magenta, and yellow. Each partial derivative in the matrix is numerically approximated based upon shifting the second coordinate by a value epsilon, and the color management unit revises the second coordinate based upon the generated matrix.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
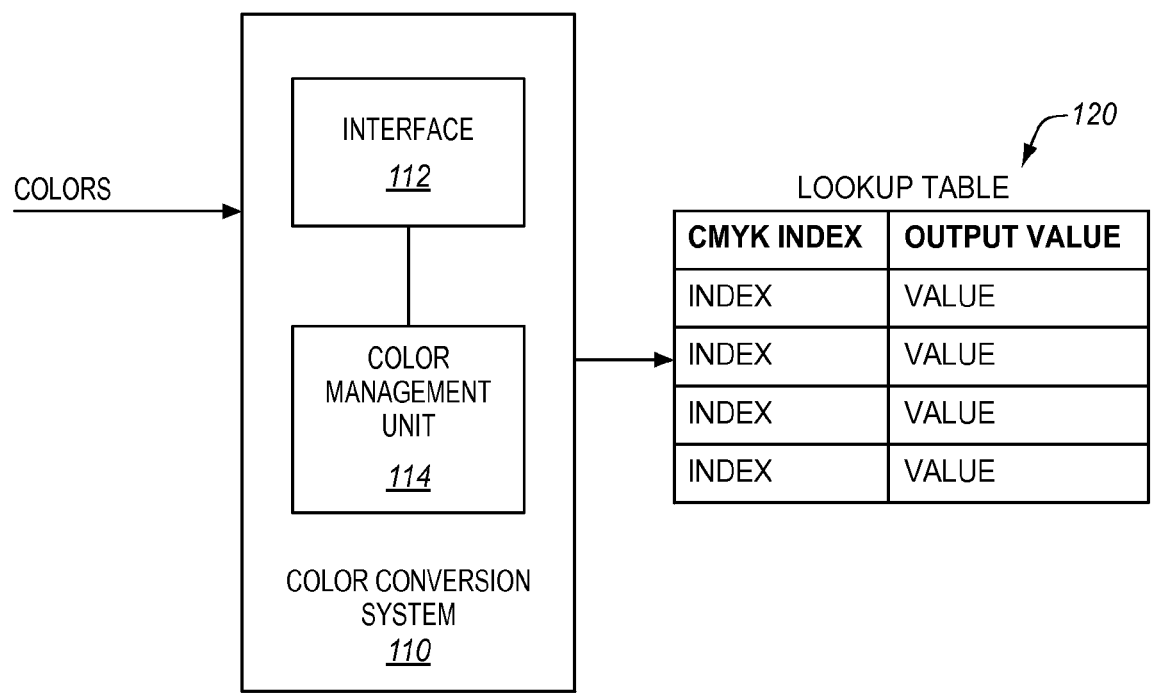
FIG. 1 is a block diagram of a color conversion system in an exemplary embodiment.

FIG. 1 is a block diagram of a color conversion system 110 in an exemplary embodiment. Color conversion system 110 comprises any system, device, or component operable to convert a color from a coordinate in a first color space to a second color space. In this embodiment, color conversion system 110 comprises interface 112 in communication with color management unit 114. Interface 112 is operable to receive a color for a first color space from a client application, a memory, or a communicatively coupled component, where the color is defined by a coordinate in the first color space. Color management unit 114 is operable to convert the color to a new coordinate in a second color space, while preserving the black level of the color. Color management unit 114 uses iterative sampling techniques to reduce the perceptual distance between the incoming coordinate of the first color space and new coordinate of the second color space. Using color conversion system 110, lookup tables (LUTs) (e.g., lookup table 120) may be generated to convert image data from the first color space to the second color space. Using these LUT's, the black levels for converted images are preserved, while perceptual differences in color between the original image and the converted image are reduced.

Further details of the operation of color conversion system 110 will be discussed with regard to FIG. 2. Assume, for this embodiment, that color conversion system 110 initializes by receiving information describing a first CMYK color space and a second CMYK color space. This information may also include conversion information used to convert colors in each of the color spaces to a perceptual color space. This conversion information may also allow color management unit 114 to directly convert from the first CMYK color space to the second CMYK color space using traditional color management techniques that do not preserve the black levels of incoming colors. Once two CMYK color spaces have been selected, colors are provided to color conversion system 110 for processing.

Figure 2:
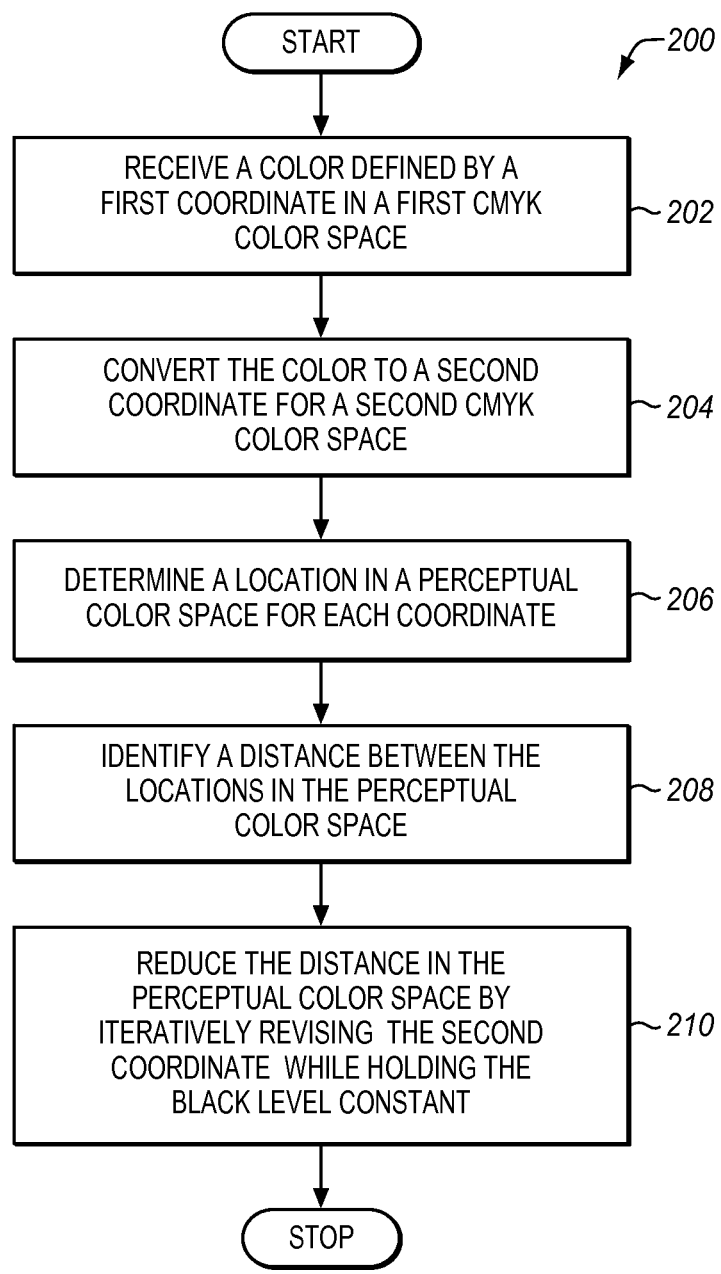
FIG. 2 is a flowchart illustrating a method for color conversion between two CMYK color spaces in an exemplary embodiment.

FIG. 2 is a flowchart illustrating a method 200 for color conversion between two CMYK color spaces in an exemplary embodiment. The steps of method 200 are described with reference to color conversion system 110 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, interface 112 receives a color defined by a first coordinate in a first CMYK color space. The color information received allows interface 112 to define a coordinate in the first CMYK color space. A coordinate in a CMYK color space is a four dimensional (4D) coordinate defined by a value for each of components for cyan, magenta, yellow, and key black (C, M, Y, K). In one embodiment, interface 112 receives information that defines the first color space, and then selects a color in the color space. Interface 112 then sends this color to color management unit 114.

In step 204, color management unit 114 converts the color to a second coordinate for a second CMYK color space. Typically in this step, the black level is held substantially constant. Depending upon the nature of the first and the second CMYK color space, holding the black level constant may comprise replacing the K value of the second coordinate with a value that is copied or scaled from the K value of the first coordinate. In one embodiment, the black level for the second coordinate is matched to the black level for the first coordinate, and a lookup table is used to convert the remaining values for C, M, and Y.

In step 206, color management unit 114 determines a location in the perceptual color space for each coordinate. The location in the perceptual color space may be determined by converting the first coordinate to the perceptual color space and converting the second coordinate to the perceptual color space using conversion information provided when color conversion system 110 is initialized. The perceptual color space may be a three dimensional (3D) Lab color space defined by a dimension for Lightness, and a dimension for each of color opponent values "a" and "b" (L, a, b). For example, the perceptual color space may be a CIELAB color space such as CIE 1976 (L*, a*, b*).

In step 208, color management unit 114 identifies a distance between the locations in the perceptual color space. This distance between the two locations may be calculated as a Euclidean distance. For example, the distance (Δ) in Lab space may be calculated according to the following formula:

$$\Delta = \sqrt{(L_1-L_2)^2 + (a_1-a_2)^2 + (b_1-b_2)^2} \qquad (1)$$

Further, the distance may be weighted such that distance along a particular dimension in the Lab space is disfavored. In some embodiments, distance may be estimated using the Delta-E 2000 distance calculating function, or similar functions that change the way that a dimension such as L is weighted, depending on the saturation level.

There is generally a non-linear relationship between a CMYK color space and a perceptual color space. Thus, simply matching the C, M, and Y values of the second coordinate to the first coordinate may create a substantial perceptual difference between the two coordinates. Step 210 provides a method for finding values for C, M, and Y that reduce undesirable perceptual differences between the two coordinates.

In step 210, color management unit 114 reduces the distance in the perceptual color space by iteratively revising the second coordinate while holding the black level constant. A deterministic algorithm (e.g., a simplex algorithm, an algorithm implementing Broyden's method, etc.) or a stochastic algorithm (e.g., a genetic algorithm, a simulated annealing algorithm, a Monte Carlo algorithm, etc.) may be used to revise the location of the second coordinate. When the second coordinate is revised, the C, M, and Y values for the second coordinate may be altered, but the black level K is held constant. Thus, the search for an "optimum" second coordinate that minimizes perceptual distance from the first coordinate is performed across three dimensions of the CMYK search space (C, M, Y).

By iteratively revising the second coordinate, inferences may be made about the relationship between coordinates in the second CMYK space and locations in the perceptual color space. For example, over small search areas, it is generally possible to model the perceptual color space using smooth monotonic functions. The second coordinate can be displaced by shifting it a small amount along the dimensions for C, M, and Y. The perceptual distance can then be measured between the shifted second coordinate and the first coordinate in perceptual color space. Using this information, it may be possible to make an educated guess regarding how to alter the second coordinate in a way that reduces the distance in perceptual color space. By iteratively sampling and revising the second coordinate in this manner, the distance in the perceptual color space may be reduced multiple times. Furthermore, color conversion system 110 may be used to convert individual colors across multiple color spaces at once (e.g., a "chain" of color spaces) using the techniques described above, so long as the input color space and the output color space are CMYK.

Once the distance in perceptual color space has been minimized or reduced below a threshold value, color management unit 114 determines that no further revisions of the second coordinate are needed. Color management unit 114 may then complete the iterative revision process, and populate a lookup table with an entry that includes the revised second coordinate for the color. The entry may be indexed, for example, by the first coordinate for the color. Color conversion system 110 may then repeat steps 202-210 for each color in the first CMYK color space to fully populate the lookup table.

Thus, utilizing the method of FIG. 2, it is possible to generate lookup tables used to convert colors from one CMYK color space to another CMYK color space. These lookup tables preserve the black levels of colors as they are converted, and these lookup tables also minimize the perceptual difference between the original colors and the converted colors that maintain black levels.

Figure 3:
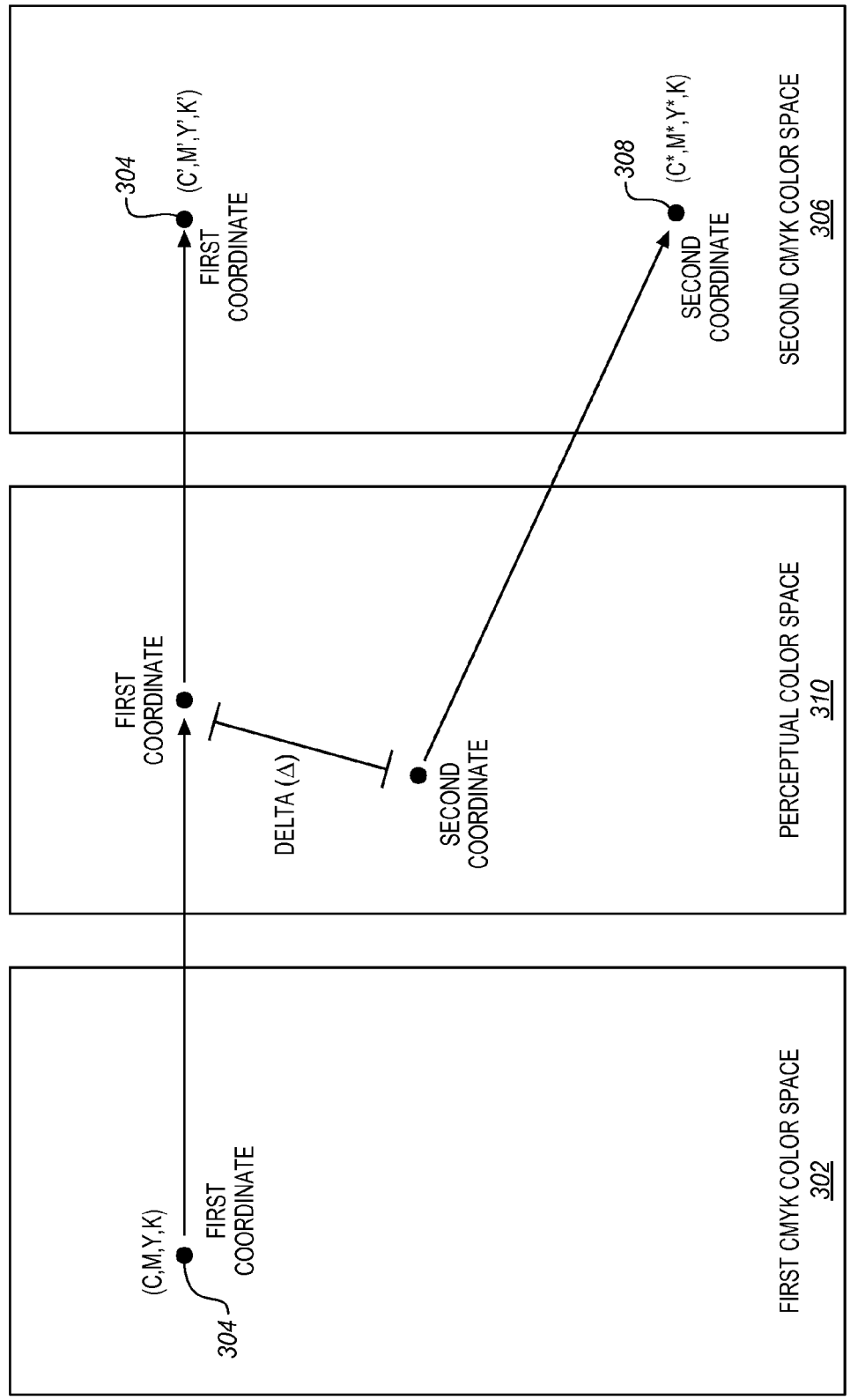
FIG. 3 is a block diagram illustrating additional details of the method for color conversion in an exemplary embodiment.

FIG. 3 is a block diagram 300 illustrating additional details of the method 200 for color conversion in an exemplary embodiment. In block diagram 300, first coordinate 304 is represented in first CMYK color space 302 at (C, M, Y, K).

First coordinate 304 corresponds with a location in second CMYK color space 306 at (C', M', Y', K'), wherein the location represents first coordinate 304 if it had been converted to the second CMYK color space 306. First coordinate 304 therefore directly corresponds with the location in the second CMYK color space, and no perceptual distance/minimal perceptual distance exists between the two. Second coordinate 308 also exists within second CMYK color space 306. Second coordinate 308 corresponds with a location in perceptual color space 310 at (C*, M*, Y*, K) having substantially the same black level as first coordinate 304. Once the location for first coordinate 304 and second coordinate 308 are known in perceptual color space 310, it is possible to measure a distance (Δ) between the two. By altering the position of second coordinate 308, and measuring a new distance between the two coordinates in perceptual color space 310, it is possible to determine whether the perceptual distance between the coordinates has increased or decreased.

The CMYK color spaces 302 and 306 depicted in FIG. 3 are four dimensional (4D) spaces, but have been simplified such that only two dimensions have been depicted. The perceptual color space 310 in FIG. 3 may be a three dimensional (3D) Lab color space, but has also been simplified such that only two dimensions have been depicted.

EXAMPLES

In this example, additional processes, systems, and methods are described in the context of a color management unit 114 engaging in the color conversion process described for method 200. Here, a gradient descent method known as Broyden's method (a deterministic algorithm) is applied to revise the second coordinate, thereby reducing the perceptual distance between first coordinate 304 and second coordinate 308. In general, second coordinate 308 may be considered a point in a CMYK search space, X. Here, X[0]=C*, X[1]=M*, X[2]=Y*, and X[3]=$K_{fixed\_output}$. The function to determine a location in a Lab space for X may be defined as:

$$f(C,M,Y,K)=(L,a,b) \qquad (2)$$

Under these circumstances, X may be revised to a new coordinate $X_1$, based upon the following formula:

$$x_1 = x - \frac{f(x)}{f'(x)} \qquad (3)$$

wherein $f'(x)$ is the derivative of $f(x)$. By manipulating X in this manner, X will be moved towards a (C, M, Y, K) coordinate that has a minimum perceptual distance from the first coordinate. If equation $f$ were known, it would be possible to calculate the exact derivative of $f(x)$. However, in complex search spaces the function $f$ is often unknowable or impractically time consuming to determine. Thus, the derivative may be calculated by numerically approximating a Jacobian for X. A Jacobian comprises a matrix of first-order partial derivatives of a function. An example of a Jacobian that may be numerically approximated for X is provided at the equation below:

$$J = \begin{pmatrix} F_L(X[0]+\varepsilon,\ldots\,)-F_L(X) & F_L(\ldots,X[1]+\varepsilon,\ldots\,)-F_L(X) & F_L(\ldots,X[2]+\varepsilon,\ldots\,)-F_L(X) \\ F_a(X[0]+\varepsilon,\ldots\,)-F_a(X) & F_a(\ldots,X[1]+\varepsilon,\ldots\,)-F_a(X) & F_a(\ldots,X[2]+\varepsilon,\ldots\,)-F_a(X) \\ F_b(X[0]+\varepsilon,\ldots\,)-F_b(X) & F_b(\ldots,X[1]+\varepsilon,\ldots\,)-F_b(X) & F_b(\ldots,X[2]+\varepsilon,\ldots\,)-F_b(X) \end{pmatrix} * \frac{1}{\varepsilon} \qquad (4)$$

In equation (4) above, the ellipses (" . . . ") are used to indicate the remaining values for X. For example, $F_L(X[0]+\epsilon, \ldots)$ equates to $F_L(X[0]+\epsilon, X[1], X[2], X[3])$, while $F_b(\ldots, X[2]+\epsilon, \ldots)$ equates to $F_b(X[0], X[1], X[2]+\epsilon, X[3])$. Since K is held constant during this optimization process, there is no need to determine partial derivatives for changed values of K.

The value epsilon ($\epsilon$) indicates the magnitude of displacement applied to X in each direction when calculating the Jacobian. Because the function $f$ may be modeled as a smooth monotonic function for small search areas, it is beneficial to use a small value for $\epsilon$. For example, the value for $\epsilon$ may be approximately 0.001. Using the calculated Jacobian, $$\frac{f(x)}{f'(x)}$$

may be approximated as:

$$\frac{F(X) - \text{Lab}}{J} \quad (5)$$

Thus, X, corresponding to the second coordinate, is revised to $X_1$ according to the formula:

$$x_1 = x - \frac{F(X) - \text{Lab}}{J} \quad (6)$$

This process is then repeated until $f(X_1)$ results in a greater perceptual distance from first coordinate 304 than $f(X)$, at which point the search is said to "converge," and the iterative revision process is completed by selecting X as the best location for second coordinate 308.

In one embodiment, color management unit 114 completes the iterative revision process when the perceptual distance is determined to be minimal or below a threshold value. In another embodiment, color management unit 114 skips the step of revising the second coordinate when it determines that the values for cyan, magenta, and yellow in the first coordinate are zero. In yet another embodiment, color management unit 114 defines a "force K" region in the perceptual color space. This region corresponds to colors that have a minimal perceptual distance from pure gray/black colors. In these circumstances, color management unit 114 revises the second coordinate by holding the black level constant, and setting the C, M, and Y values for the second coordinate to zero.

Figure 4:
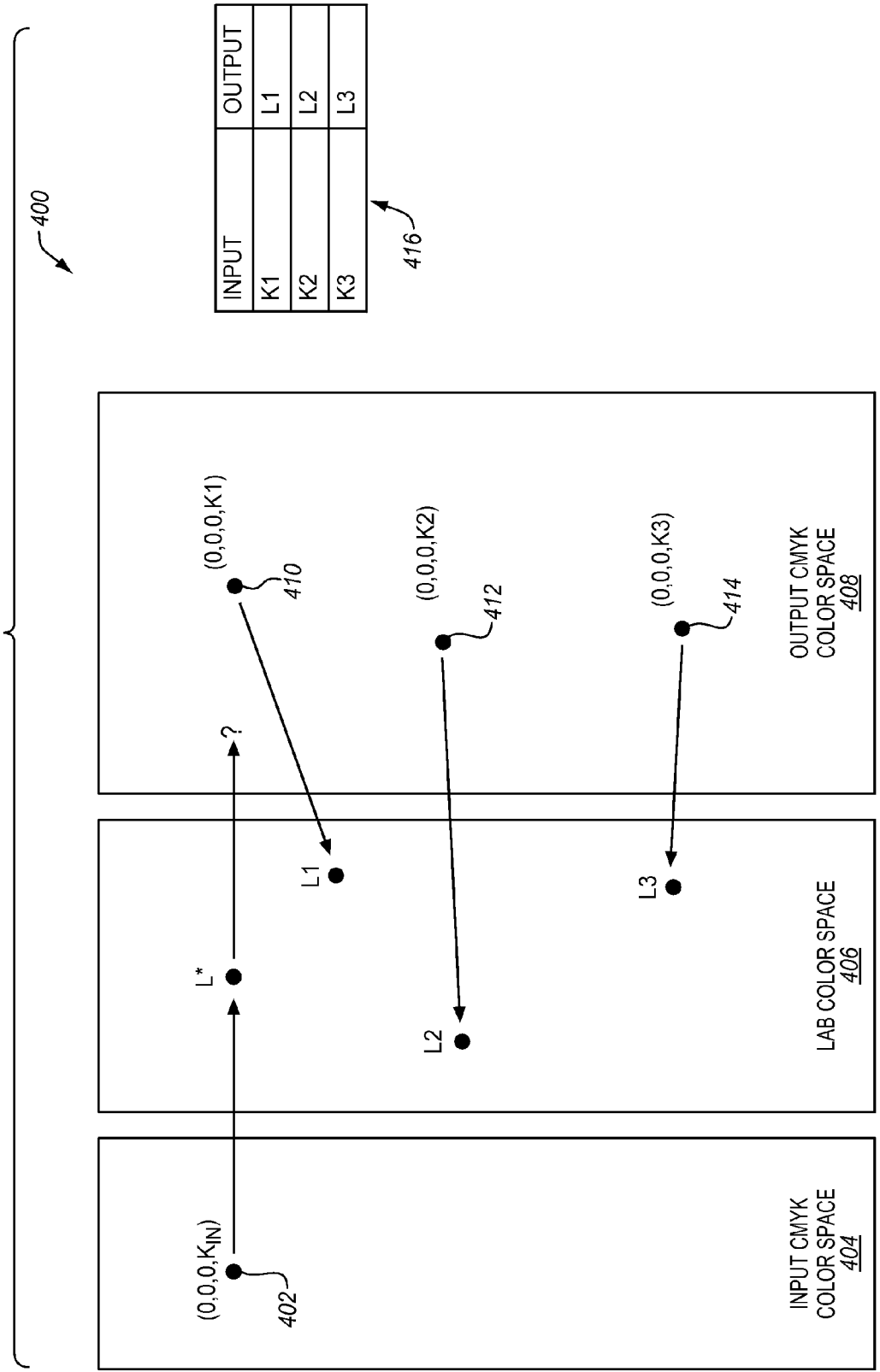
FIG. 4 is a block diagram illustrating details for selecting a black level to hold constant in an exemplary embodiment.

In a second example, FIG. 4 is a block diagram 400 illustrating details for selecting a black level to hold constant in an exemplary embodiment. While typically, the black level to hold constant (i.e., the black level of the second coordinate) is copied from the black level of the first coordinate, it may be desirable to select the black level for the second coordinate based upon a tone curve. A tone curve is a remapping of color tonality, specified as a function from input level to output level, used as a way to emphasize colors or other elements in a picture. For example, an altered tone curve can be used to alter the brightness of an image in different spectrums of color (or different black levels).

The following process may be performed to generate a tone curve for K that correlates K values in an output color space (output K) to luminosity values in a Lab color space (L). Generating a tone curve is desirable when the conversion information provided to color conversion system 110 includes parameters for converting from the second CMYK space to a perceptual color space, but does not include parameters for converting in the reverse direction (i.e., conversions from the perceptual color space to the second CMYK color space). According to FIG. 4, a K value 402 ($K_{IN}$) corresponding to the first coordinate is converted from an input CMYK space 404 to a Lab color space 406. The luminosity value for the conversion, L*, is saved in memory.

Because no conversion data allows for direct conversion of L* into a K value in output CMYK color space 408, color management unit 214 engages in an interpolation process to estimate an appropriate output K value. Color management unit 214 selects a set of points in the output color space 408 that are sampled in order to generate a tone curve correlating output K values to luminosity values. Any number of points may be chosen by color management unit 214. Preferably, points are sampled which cover substantially the entire range of K values in output CMYK color space 408 and luminosity (L) values in Lab color space 406. Here, points 410, 412, and 414, corresponding to output values K1-K3, are selected. These points are then converted to Lab color space 406, and the output K values are stored along with the luminosity values L1-L3 in table 416.

Figure 5:
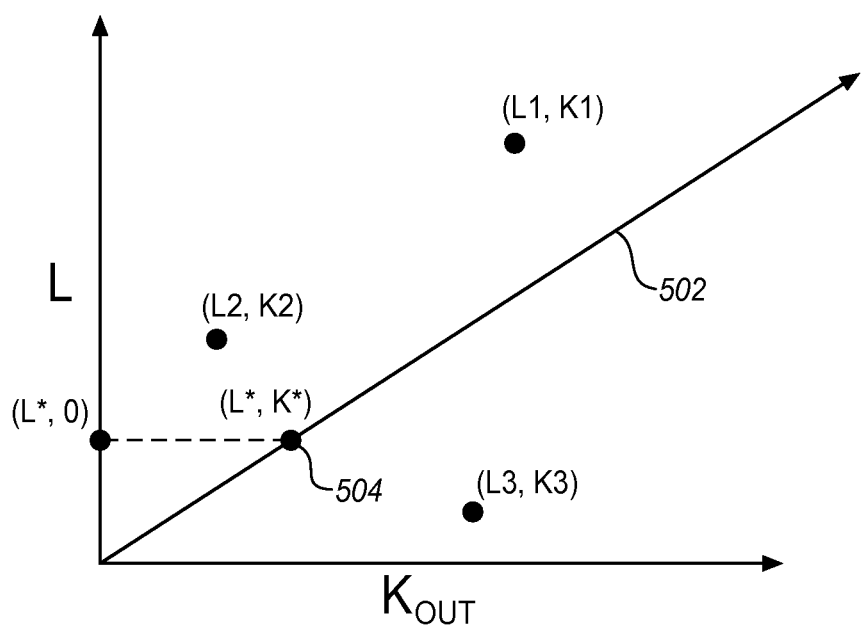
FIG. 5 is a block diagram illustrating further details for selecting a black level to hold constant in an exemplary embodiment.

FIG. 5 is a block diagram 500 illustrating further details for selecting a black level to hold constant in an exemplary embodiment. Once multiple correlations between output K and L have been performed, it is possible to generate a tone curve describing the relationship between output K values ($K_{OUT}$) and luminosity values (L). The tone curve may be interpolated using any known regression technique. In this embodiment, tone curve 502 is a linear interpolation, but tone curve 502 could also include quadratic curves, power curves, exponential curves, and others. In one embodiment, if the error of the interpolation is too high, color management unit 114 samples more points and the tone curve is re-created using the new points to reduce the error. Once tone curve 502 is generated, L* may be entered into the equation for the tone curve to calculate a value K* at 504, representing an output K value that relates to L* of the first coordinate. This value K* may then be used to instead of the input K value when selecting a K value to use for the second coordinate.

Figure 6:
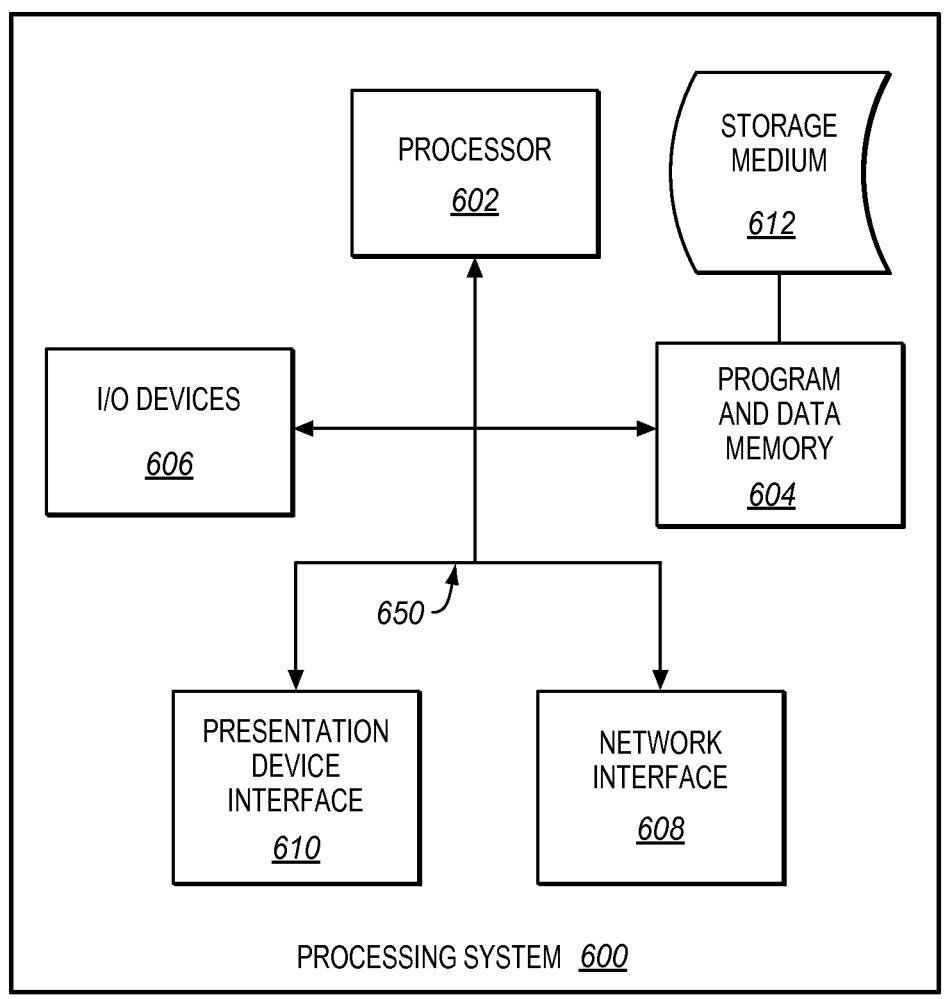
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of color conversion system 114 to perform the various operations disclosed herein. FIG. 6 illustrates a processing system operable to execute a computer readable medium embodying programmed instructions to perform desired functions in an exemplary embodiment. Processing system 600 is operable to perform the above operations by executing programmed instructions tangibly embodied on a computer readable storage medium 612. In this regard, embodiments of the invention can take the form of a computer program accessible via the computer-readable medium 612 providing program code for use by a computer or any other instruction execution system. For the purposes of this description, a computer readable storage medium 612 can be anything that can contain or store the program for use by the computer.

The computer readable storage medium 612 can be an electronic, magnetic, optical, electromagnetic, infrared, or semiconductor device. Examples of the computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 600, being suitable for storing and/or executing the program code, includes at least one processor 602 coupled to memory elements 604 through a system bus 650. The memory elements 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A system, comprising:
   an interface that receives a color defined by a first coordinate in a first Cyan, Magenta, Yellow, and Key black (CMYK) color space;
   a color management unit that
   converts the color to a second coordinate for a second CMYK color space having a black level that matches the black level of the color by selecting a set of points, in the second CMYK color space, that are sampled to cover an entire range of black values in the second CMYK color space and luminosity values in a perceptual color space,
   determines a location in the perceptual color space for each of the first coordinate and the second coordinate,
   identifies a distance between the locations in the perceptual color space, and
   reduces the distance in the perceptual color space between the two locations by iteratively revising the second coordinate in the second CMYK color space while holding the black level of the second coordinate constant.

2. The system of claim 1, wherein:
   the color management unit iteratively revises the second coordinate using a stochastic optimization technique.

3. The system of claim 1, wherein:
   the color management unit iteratively revises the second coordinate by:
   generating a matrix of partial derivatives along the dimensions for cyan and magenta and yellow, wherein each partial derivative in the matrix is numerically approximated based upon shifting the second coordinate by a value epsilon; and
   revising the second coordinate based upon the generated matrix.

4. The system of claim 3, wherein:
   epsilon is approximately 0.001.

5. The system of claim 1, wherein:
   the color management unit completes the iterative revising process by:
   revising the second CMYK coordinate;
   detecting that the distance between the locations in perceptual color space has increased since the previous iteration; and
   returning the second CMYK coordinate to the coordinate that was used prior to the revising.

6. The system of claim 1, wherein:
   the color management unit completes the iterative revising process and assigns the second coordinate as an entry for a color conversion lookup table (LUT);
   the system uses the LUT to convert an image from the first CMYK space to the second CMYK space; and
   the system transmits the converted image for display via a presentation device.

7. The system of claim 1, wherein:
   the perceptual color space comprises a Lab color space.

8. The system of claim 1, wherein:
   the color management unit further determines that the distance in the perceptual color space is less than a threshold value, and completes the iterative revising process responsive to making this determination.

9. The system of claim 1, wherein:
   the black level for the second coordinate is based upon a tone curve that correlates luminosity values with Key black values in the first CMYK color space.

10. The system of claim 1, wherein:
    the distance identified by the color management unit is a perceptually uniform distance.

11. A method, comprising:
    receiving a color defined by a first coordinate in a first Cyan, Magenta, Yellow, and Key black (CMYK) color space;
    converting the color to a second coordinate for a second CMYK color space having a black level that matches the black level of the color by selecting a set of points, in the second CMYK color space, that are sampled to cover an entire range of black values in the second CMYK color space and luminosity values in a perceptual color space;
    determining a location in the perceptual color space for each of the first coordinate and the second coordinate;
    identifying a distance between the locations in the perceptual color space; and
    reducing the distance in the perceptual color space between the two locations by iteratively revising the second coordinate in the second CMYK color space while holding the black level of the second coordinate constant.

12. The method of claim 11, wherein:
    iteratively revising the second coordinate comprises using a stochastic optimization technique.

13. The method of claim 11, wherein:
    iteratively revising the second coordinate comprises:
    generating a matrix of partial derivatives along the dimensions for cyan and magenta and yellow, wherein each partial derivative in the matrix is numerically approximated based upon shifting the second coordinate by a value epsilon; and
    revising the second coordinate based upon the generated matrix.

14. The method of claim 13, wherein:
    epsilon is approximately 0.001.

15. The method of claim 11, further comprising:
completing the iterative revising process by:
- revising the second CMYK coordinate;
- detecting that the distance between the locations in perceptual color space has increased since the previous iteration; and
- returning the second CMYK coordinate to the coordinate that was used prior to the revising.

16. The method of claim 11, further comprising:
completing the iterative revising process;
assigning the second coordinate as an entry for a color conversion lookup table (LUT);
converting an image from the first CMYK space to the second CMYK space using the LUT; and
transmitting the converted image for display via a presentation device.

17. The method of claim 11, wherein:
the perceptual color space comprises a Lab color space.

18. The method of claim 11, further comprising:
determining that the distance in the perceptual color space is less than a threshold value; and
completing the iterative revising process responsive to making this determination.

19. The method of claim 11, wherein:
the black level for the second coordinate is based upon a tone curve that correlates luminosity values with Key black values in the first CMYK color space.

20. The method of claim 11, wherein:
the distance identified by the color management unit is a perceptually uniform distance.

* * * * *